United States Patent [19]

Shelley, Jr. et al.

[11] 3,947,522
[45] Mar. 30, 1976

[54] EPOXY RESIN COMPOSITIONS

[75] Inventors: Ralph R. Shelley, Jr.; James A. Clarke, both of Lake Jackson, Tex.

[73] Assignee: The Dow Chemical Company, Midland, Mich.

[22] Filed: Feb. 12, 1975

[21] Appl. No.: 549,398

Related U.S. Application Data

[63] Continuation of Ser. No. 340,392, March 12, 1973, abandoned.

[52] U.S. Cl. .............................. 260/837 R; 260/836
[51] Int. Cl.² .......................................... C08L 63/10
[58] Field of Search ........................ 260/836, 837 R

[56] References Cited
UNITED STATES PATENTS

| | | | |
|---|---|---|---|
| 2,935,488 | 5/1960 | Phillips et al. | 260/835 |
| 3,135,716 | 6/1964 | Uraneck et al. | 260/836 |
| 3,639,500 | 2/1972 | Muny et al. | 260/837 |
| 3,678,130 | 7/1972 | Klapprott et al. | 260/836 |
| 3,707,583 | 12/1972 | McKown | 260/836 |
| 3,873,638 | 3/1975 | Olson | 260/837 |

*Primary Examiner*—Murray Tillman
*Assistant Examiner*—J. Ziegler
*Attorney, Agent, or Firm*—James G. Carter

[57] ABSTRACT

Epoxy resins modified with copolymers containing reactive groups such as -COOH are improved by vulcanizing the copolymer with an organic peroxide or sulfur.

The resultant epoxy resins are useful in preparing adhesives with improved properties at elevated temperatures.

25 Claims, No Drawings

EPOXY RESIN COMPOSITIONS

CROSS-REFERENCE TO RELATED APPLICATION

This is a continuation, of application Ser. No. 340,392 filed Mar. 12, 1973, now abandoned.

This invention concerns epoxy resin compositions which have been modified with acrylonitrile- or methacrylonitrile-butadiene polymers having a reactive group pending therefrom and cured compositions thereof.

Epoxy resins have heretofore been modified with polymers containing reactive groups such as COOH as described in U.S. Pat. No. 3,678,131. While these products are improved over the unmodified epoxy resins, some of the properties such as the high temperature adhesive properties are somewhat lacking.

It has now been discovered that if the epoxy resins modified with polymers containing a reactive group are vulcanized, the high temperature adhesive properties are unexpectedly enhanced and in some instances the room temperature adhesive properties are also enhanced.

The present invention therefore concerns curable epoxy resin compositions which are the vulcanized compositions comprising:
A. an epoxy resin having more than one vicinal epoxy group per molecule,
B. from about 0.03 to about 0.2 and preferably from about 0.08 to about 0.12 parts by weight per part of component (A) of a butadiene-acrylonitrile or butadiene-methacrylonitrile polymer having pendant reactive groups selected from COOH, OH, and SH, said polymer containing from about 70 to about 90 and preferably from about 80 to about 85 percent by weight of butadiene and from about 10 to about 30 and preferably from about 15 to about 20 percent by weight of acrylonitrile or methacrylonitrile.

The polymer modified liquid epoxy resins of the present invention are conveniently prepared by reacting the polymer containing pendant COOH, OH or SH groups with the epoxy resin in the presence of a suitable catalyst at a temperature of from about 80°C to about 130°C, preferably from about 100° to about 120°C until the reaction between the epoxy groups and the COOH, OH or SH groups is completed. The polymer modifier is then vulcanized with an organic peroxide or sulfur at a temperature of from about 120°C to about 160°C and preferably from about 140°C to about 150°C for from about 1.0 to about 2.0 hours.

The polymer modified solid epoxy resins of the present invention are conveniently prepared by mixing a liquid epoxy resin with the polymer modifier and a dihydroxyl-containing compound and heating in the presence of a suitable catalyst to cause reaction between the liquid epoxy resin and the reactive groups of the polymer modifier and with the dihydroxyl-containing compound. Then the resultant product is vulcanized with sulfur or an organic peroxide.

Suitable catalysts include those normally employed in the preparation of epoxy resins from polyepoxides and dihydroxyl-containing compounds such as, for example, tertiary amines, quaternary ammonium compounds, phosphonium compounds and the like. Such catalysts and procedures are well known in the art such as in U.S. Pat. No. 3,477,990, *HANDBOOK OF EPOXY RESINS* by Lee and Neville, McGraw Hill, 1967, and Canadian Pat. No. 893,191.

Alternatively, the liquid epoxy resin can be prereacted with the modified polymer compound and then the resultant product can be reacted with a dihydroxyl-containing compound and this product subsequently vulcanized to produce the resultant vulcanized, polymer modified solid epoxy resins of the present invention.

The quantities of liquid epoxy resin and dihydroxyl-containing compound which are employed to produce a solid epoxy resin are well known in the art.

The preparation of the polymer modified solid epoxy resins can be carried out at temperatures from about 110°C to about 150°C and preferably from about 130°C to about 140°C and subsequently vulcanized at temperatures of from about 120°C to about 160°C and preferably 140°C to about 150°C. The time to complete each reaction is, of course, dependent upon the temperature, but each reaction can usually be completed within from 1 to about 3 and preferably from about 2 to about 2.5 hours.

Suitable organic peroxides which may be employed as vulcanization agents include, for example, aliphatic peroxides such as, for example, di-t-butyl peroxide, t-butyl hydroperoxide and aromatic peroxides, such as, for example, dicumyl peroxide, t-butyl-cumyl peroxide, methyl cumyl peroxide, mixtures thereof and the like.

The organic peroxide vulcanization agent is employed in quantities of from about 1.5 to about 10 and preferably from about 3 to about 4 parts by weight per 100 parts by weight of the reactive polymer modifier employed.

The sulfur vulcanization agent is employed in quantities of from about 3 to about 15 and preferably from about 9 to about 11 parts by weight per 100 parts by weight of the polymer modifier employed.

Suitable liquid epoxy resins which can be employed in the present invention include but are not limited to those represented by the following formulas.

A.

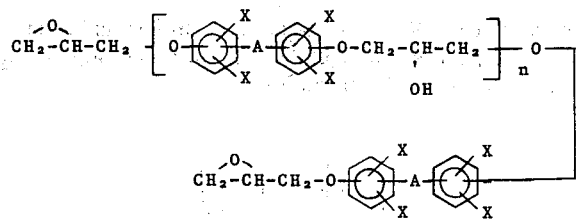

wherein A is selected from the group consisting of a divalent hydrocarbon group having from 1 to 6 carbon atoms,

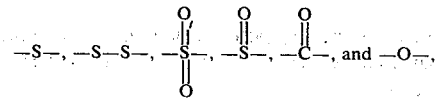

X is hydrogen or a halogen atom such as, for example, chlorine or bromine, and n is an integer having an average value of from about 0 to about 5.5.

B.

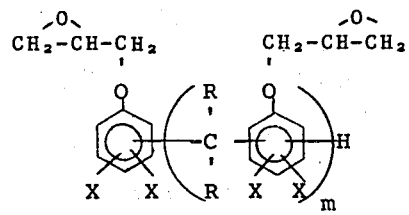

wherein m has an average value of from about 1.01 to about 5, preferably from about 1.05 to about 4, each X is independently hydrogen, halogen, such as, for example, chlorine or bromine, or an alkyl group of from 1 to about 4 carbon atoms and each R is independently hydrogen or an alkyl group of from 1 to about 4 carbon atoms.

Suitable dihydroxy compounds which can be employed to prepare the polymer modified solid epoxy resins of the present invention include but are not limited to those represented by the general formulas:

C.
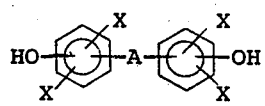

D.
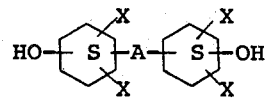

wherein each X is independently hydrogen, chlorine or bromine, and A is a divalent hydrocarbon group having from 1 to about 6 carbon atoms,

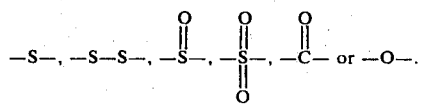

E.
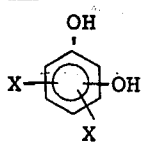

F.
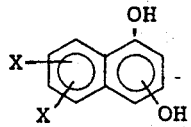

wherein each X is independently hydrogen, chlorine, bromine or an alkyl group having from about 1 to about 6 carbon atoms.

Suitable reactive polymer modifiers which may be employed include acrylonitrile-butadiene polymers, methacrylonitrile-butadiene polymers, or acrylonitrile-methacrylonitrile-butadiene polymers, mixtures thereof and the like which also contain terminal or pendant reactive -COOH groups, -OH groups or -SH groups. Suitable polymers have average molecular weights of from about 2,000 to about 20,000, a reactive group functionality of from about 1.2 to about 5 and preferably from about 1.7 to about 2.4 and wherein said reactive polymer modifiers contain from about 10 to about 30 and preferably from about 15 to about 26 percent by weight of acrylonitrile, methacrylonitrile or mixtures thereof.

These polymers are known in the art and can be prepared by any suitable process for polymerizing ethylenically unsaturated compounds and such processes usually employ free radical catalysts such as 4,4'-azobis(cyanovaleric acid), azobisisobutyronitrile and the like. Pendant or terminal COOH groups can then be converted to an -OH or -SH group if desired.

Another method is to employ ethylencially unsaturated monomers containing -COOH, -OH or -SH groups in the initial polymerization. Suitable such monomers include, for example, acrylic acid, methacrylic acid, allyl alcohol, allyl mercaptan, mixtures thereof and the like.

Suitable such polymer modifiers and methods for their preparation are given in *RUBBER CHEMISTRY AND TECHNOLOGY*, Vol. 42, Feb. 1969, pp. 71–106 and such polymers and methods are incorporated herein by reference.

Many such polymers are available commercially from B. F. Goodrich under the tradename HYCAR.

The modified epoxy resins of the present invention can be employed in adhesives, coatings, laminates and the like.

The modified epoxy resins of the present invention can be cured with the usual curing agents or curing catalysts for epoxy resins including primary, secondary, and tertiary aliphatic amines, aziridines, polycarboxylic acids and anhydrides thereof, Lewis acids, polythiols, dicyandiamides, aromatic amines, mixtures thereof and the like. The curing agents or curing catalysts may be employed in quantities known in the art and the curing agents are usually employed in quantities of from about 80 percent to about 200 percent of the theoretical stoichiometric quantity.

The modified epoxy resins of the present invention can be employed with the usual modifiers and additives including fire retardant agents, pigments, dyes, flow control agents, curing accelerators, fillers, mold release agents, mixtures thereof and the like.

The following examples are illustrative of the present invention but are not to be construed as to limiting the scope thereof in any manner.

EXAMPLE 1

A. Preparation of Modified Solid Epoxy Resin Vulcanized With Dicumyl Peroxide

To a reaction vessel equipped with stirrer and temperature control means, was added 15 grams of a butadiene-acrylonitrile polymer containing 1.85 carboxyl groups per molecule, 18.8 percent by weight of acrylonitrile and an average molecular weight of 3,500, 150 grams of the diglycidyl ether of bisphenol A having an epoxide equivalent weight of about 190 and 43 grams of bisphenol A. The mixture was heated to 100°C and 0.3 gram of tetrabutyl phosphonium acetate·acetic acid complex catalyst as a 70 percent solution in methanol was added. The mixture was heated at 140°C for 30 minutes. This 30 minute interval was to permit the carboxyl groups to react with the epoxy. After 30 minutes 0.5 gram of dicumyl peroxide was added. The reaction temperature has usually started to exotherm prior to addition of the peroxide and the exotherm continues to a temperature of approximately 180°C. The temperature was then maintained at approximately 160°C for 2.5 hours to complete the reaction between the epoxy resin and the bisphenol A. The resultant modified solid resin was light yellow in color and had an epoxide content of 7.8 percent (EEW 555) and a Durran's softening point of 70°C.

B. Preparation of Modified Solid Epoxy Resin Vulcanized With Sulfur

To a reaction vessel equipped with stirrer and temperature control means was added 15 grams of a polybutadiene-acrylonitrile polymer containing 1.85 carboxyl groups per molecule, 18.8 percent by weight of acrylonitrile and an average molecular weight of 3,500, 150 grams of diglycidyl ether of bisphenol A having an epoxide equivalent weight of about 190 and 43 grams of bisphenol A. The mixture was heated to 100°C and 0.3 gram of tetrabutyl phosphonium acetate·acetic acid complex catalyst as a 70 percent solution in methanol was added. The mixture was heated at 140°C for 30 minutes. This 30 minute interval was to permit the carboxyl groups to react with the epoxy. After 30 minutes 1.5 grams of sulfur was added. The reaction temperature has usually started to exotherm prior to addition of the sulfur and the exotherm continues to a temperature of approximately 180°C. The temperature was then maintained at approximately 160°C for 2.5 hours to complete the reaction between the epoxy resin and the bisphenol A. The resultant modified solid resin was light yellow in color and had an epoxide content of 7.9 percent (EEW 544) and a Durran's softening point of 70°C.

C. Preparation of Modified Solid Epoxy Resin Without Vulcanization (For Comparative Purposes)

The reactants and procedure of Part A above was repeated except that the dicumyl peroxide was omitted. The resultant solid epoxy resin was white opaque in color and had an epoxide content of 8.2 percent (an average epoxide equivalent weight, EEW, of about 525) and a Durran's softening point of about 69°C.

D. Preparation of Adhesives from A, B and C Prepared Above

The following adhesive formulation was melt mixed and applied to aluminum, Type 2024 T-3 strips. Two such strips were overlapped ½ inch and cured at 175°C for about 1.5 hours. The resultant test strips were tested according to ASTM D-1002-64 at 77°F and 250°F. The results are given in Table I.

Adhesive Formulation 20 grams of solid epoxy resin prepared in A, B or C.
10 grams of aluminum powder
0.4 grams of colloidal silica
0.6 grams of dicyandiamide

TABLE I

| Epoxy Resin Employed | Tensile Shear Strength, psi | |
| --- | --- | --- |
| | 77°F | 250°F |
| A (vulcanized with dicumyl peroxide) | 6450 | 3300 |
| B (vulcanized with sulfur) | 5750 | 1500 |
| C (unvulcanized) | 5680 | 1100 |

EXAMPLE 2

A. Preparation of Vulcanized Carboxyl Containing Polymer Modified Epoxy Resin

To a reaction vessel equipped with stirrer and temperature control means was added 15 grams of an acrylonitrile-butadiene copolymer having an average molecular weight of 3,400, an acrylonitrile content of 18 percent carboxyl functionality of 2.4, and 103.5 gm of the diglycidyl ether of bisphenol A having an epoxide equivalent weight of about 190. The mixture was heated to 100°C and 0.2 gm of tetrabutyl phosphonium acetate·acetic acid complex catalyst as a 70 percent solution in methanol was added. The mixture was held at 100°C for 30 minutes. This 30 minutes interval was to permit the carboxyl groups to react with the epoxy. After 30 minutes the temperature was raised to 145°C and 18 grams of bisphenol S was added. After 5 minutes to allow mixing of the bisphenol S, 0.5 gm dicumyl-peroxide was added. The reaction was continued for 1 hour at 145°C. The average EEW of the resultant solid epoxy resin was about 380.

B. Preparation of Unvulcanized Carboxyl Containing Polymer Modified Epoxy Resin (Comparative)

The procedure was the same as in A. above except for the final step in that no dicumyl peroxide was added.

The average EEW of the resultant solid epoxy resin was about 375.

C. Preparation and Testing of Adhesives from A and B

Adhesives were prepared from the resins prepared in A and B above employing the following formulation.

20 grams of epoxy resin
10 grams of aluminum powder
0.4 grams of colloidal silica
0.6 grams of dicyandiamide The adhesives were applied to aluminum strips and cured at 175°C for 2 hours, and the lap shear strengths at 77°F and 250°F were determined according to ASTM D-1002-64. The results are given below.

| Epoxy Resin Employed | | Lap Shear Strength, psi | |
| --- | --- | --- | --- |
| | | 77°F | 250°F |
| A. | Vulcanized | 5650 | 3750 |
| B. | Unvulcanized | 4600 | 2100 |

EXAMPLE 3

A. Preparation of Vulcanized Mercaptan (SH) Containing Polymer-Modified Epoxy Resin To a reaction vessel equipped with stirrer and temperature control means was added 15 grams of an acrylonitrile-butadiene copolymer having an average molecular weight of 3,000, an acrylonitrile content of 24 percent and mercaptan (SH) functionality of 1.6, and 150 grams of the diglycidyl ether of bisphenol A having an epoxide equivalent weight of about 190. The mixture was heated to 100°C and 0.16 gm of tetrabutylphosphonium acetate·acetic acid complex catalyst as a 70 percent solution in methanol was added. The mixture was held at 100°C for 30 minutes. This 30 minutes interval was to permit the mercaptan groups to react with the epoxy. After 30 minutes the temperature was raised to 145°C. and 0.5 gram of dicumyl-peroxide was added. The reaction was continued for 1 hour at 145°C.

The resultant vulcanized polymer modified epoxy resin was a light amber colored liquid having an average EEW of about 205.

B. Preparation of Unvulcanized Mercaptan Containing Polymer Modified Epoxy Resin (Comparative)

The procedure was the same as in A above except that the reaction was completed after 30 minutes at 100°C and no dicumyl peroxide was employed.

The average EEW of the light amber liquid resin was about 205.

C. Preparation and Testing of Adhesives from A and B

Adhesives were prepared from the resins prepared in A and B above employing the following formulation.
  20 grams of epoxy resin
  13 grams of aluminum powder
  1.0 gram of colloidal silica
  1.0 gram of dicyandiamide The adhesives were applied to aluminum strips and cured at 175°C for 2 hours, and the lap shear strengths at 77°F and 250°F were determined according to ASTM D-1002-64. The results are given below.

| Epoxy Resin Employed | | Lap Shear Strength, psi 77°F | 250°F |
|---|---|---|---|
| A. | Vulcanized | 3766 | 1530 |
| B. | Unvulcanized | 4133 | 1300 |

EXAMPLE 4

To a reaction vessel equipped with stirring and temperature control means was added 150 grams of a diglycidyl ether of bisphenol A having an average EEW of 187 and 30 grams of a carboxyl containing acrylonitrile butadiene polymer having an average molecular weight of about 3500, containing about 18.6 percent by weight of acrylonitrile and containing about 2.7 wt. percent of COOH groups and an average functionality of COOH groups of about 2. After degassing resultant mixture at 80°C for 15 minutes, 75 milligrams of tetrabutyl phosphonium acetate·acetic acid complex catalyst was added and the reaction conducted at 120°C for 2 hours.

Then 60 grams of the resultant unvulcanized product was removed, and for the purposes herein, this is designated as resin 4-A and has an average EEW of about 235.

To the remaining product 0.3 gram of dicumyl peroxide was added and the reaction temperature was raised to 145°C and the reaction conducted under vacuum for 2 hours. The decomposition of the dicumyl peroxide was essentially complete and about 50 percent of the polymer-modifier present was vulcanized. The resultant vulcanized product, for purposes herein, is designated as resin 4-B and had an average EEW of about 236.

Adhesives were prepared from each of the above prepared modified-resins employing the following formulation.
  6 grams of modified resin
  5 grams of the unmodified diglycidyl ether of bisphenol A having an average EEW of 187
  8 grams of aluminum powder
  0.5 gram of colloidal silica
  0.8 gram of dicyandiamide
  0.3 gram of dichlorophenyl dimethylurea Lap shear samples were prepared using 4 ½ inch × 1 inch × 0.020 inch dichromate etched type 2024-T3 aluminum strips overlapped ½ inch. The strips were then cured at 280°F for 1 hour. Lap shear values were then obtained according to ASTM D-1002 at various temperatures. The results are reported in the following table as the average of three samples.

| Test Temperature, °F | Resin 4-A Unvulcanized (Comparative) | Resin 4-B Vulcanized (Present Inv.) |
|---|---|---|
| 77 | 2610 psi | 5390 psi |
| 150 | 3180 | 5340 |
| 200 | 3330 | 5000 |
| 240 | 2370 | 3760 |
| 260 | 1420 | 2560 |
| 280 | 1020 | 1520 |
| 300 | 730 | 930 |

EXAMPLE 5

To a reaction vessel equipped with stirring and temperature control means was added 200 grams of a diglycidyl ether of bisphenol F (p,p'-methylenediphenol) having an average EEW of about 167 and 18 grams of a carboxyl containing acrylonitrile-butadiene polymer having about 28 percent acrylonitrile, an average COOH functionality of about 1.9, 0.047 equivalent of COOH per 100 grams of polymer and an average molecular weight of 3,500. After devolatilizing the mixture at 80°C under vacuum, the vacuum was replaced with an atmosphere of nitrogen and 100 milligrams of tetrabutyl phosphonium acetate.acetic acid complex catalyst was added. The temperature was raised to 125°C and maintained thereat for about 1 ½ hours. Then 0.6 gram of dicumyl peroxide was added and the reaction continued for 2 hours at 145°C under vacuum. One fourth, 54.5 grams of the resultant clear amber liquid product was removed and for the purposes herein designated as resin 5-A having a percent epoxide of 22.6 (190 EEW) and a viscosity of 9,200 centipoises. To the remainder of the product, 0.45 gram of dicumyl peroxide was added and the reaction continued at 150°C for 2 hours. One-half of the resultant clear amber liquid product having a percent epoxide of 22.6 (EEW of about 190) and a viscosity of 18,200 centipoises was removed and for the purposes herein designated as resin 5-B. To the remainder of the resultant product 0.3 grams of dicumyl peroxide was added and the reaction continued under vacuum for 2 hours at 150°C. The resultant product was a clear, bright yellow liquid having a viscosity of 22,000 centipoises and a percent epoxide of 22.5 (191 EEW) and for the purposes herein it was designated resin 5-C.

The mole ratio of peroxide/polymer modifier of each of the products prepared above was as follows.

| Resin | Peroxide/polymer modifier mole ratio |
|---|---|
| 5-A | 0.5:1 |
| 5-B | 1.0:1 |
| 5-C | 1.5:1 |

Each of the three products were employed as adhesives employing the following composition.

10.9 grams modified resin
8 grams aluminum powder
0.5 grams colloidal silica
0.8 grams dicyandiamide
0.2 grams melamine The adhesives were applied to etched 4 ½ inch × 1 inch × 0.064 inch Type 2024-t- 3 aluminum test strips for lap shear and Type 304 stainless steel strips for climbing drum peel, and after heating at 175°C for 0.75 hours the lap shear and climbing drum peel strength values were determined at 77°F as described in ASTM D 1002-64 and ASTM D-1781-62. The results are given in the following table.

| Resin No. | Lap Shear Strength (psi) | Climbing Drum Peel Strength lb/inch |
|---|---|---|
| 5-A | 5930 | 108 |
| 5-B | 5740 | 114 |
| 5-C | 5660 | 113 |

The above example indicates that no particular advantage over a slight increase in the climbing drum peel strength is obtained by employing mole ratios of peroxide/polymer modifier greater than about 0.5:1.

EXAMPLE 6

To a 500 ml 3-neck flask equipped for agitation, nitrogen purge, evacuation, and temperature control was added:

150 grams of a 2.1 functional epoxy novolac resin having an EEW of about 167.
15 grams CTBN (carboxyl terminated butadiene-acrylonitrile rubber containing 26 percent acrylonitrile and having an average molecular weight of about 3500)
50 milligrams tetrabutylphosphonium acetate.acetic acid complex catalyst.

The mixture was raised to a temperature of 105°C, evacuated and held ½ hr. to complete the reaction between carboxyl and epoxide. Then 0.50 gram of di-tertiary butyl peroxide was added and the temperature raised quickly to 180°C (the temperature at which the rate of decomposition of this peroxide is the same as that for dicumyl peroxide at 155°C). A limited vacuum was pulled (to 100 mm Hg.) and held ½ hr. Volatility of this peroxide requires caution in pulling a high vacuum at such an elevated temperature. To assure that peroxide was actually present under these conditions, at the end of this ½ hour interval the vacuum was released using nitrogen, and 0.25 g. additional di-tert. butyl peroxide was added dropwise. The reaction mixture was then agitated under 1 atmosphere nitrogen pressure for 15 minutes and under full vacuum an additional 15 minutes, all at 180°C. The product was then cooled and poured off as a clear amber liquid, with a viscosity at room temperature of 28,200 centipoises and an epoxide content of 22.6 percent (191 EEW).

Adhesives were prepared from the above product employing the following composition.

11 grams modified resin
8 grams aluminum powder
0.5 grams colloidal silica
0.8 grams dicyandiamide
0.2 grams melamine The adhesives were applied to etched 4 ½ inch × 1 inch × 0.064 inch Type 2024-T-3 aluminum test strips for lap shear and Type 304 stainless steel strips for climbing drum peel, and after heating at 175°C for 0.75 hours the lap shear and climbing drum peel strength values were determined at 77°F as described in ASTM D 1002-64 and ASTM D-1781-62. The lap shear strength was 5,490 psi and the climbing drum peel strength was 106 lb/in.

EXAMPLE 7 — Thiol-Containing Polymer Modifier

A. The procedure, reactants and concentration of reactants were the same as in Example 1-A except that the polymer employed was an acrylonitrile-butadiene copolymer having an average molecular weight of about 3000, an acrylonitrile content of about 24 percent and a mercaptan (SH) functionality of about 1.6. The resultant modified epoxy resin had an EEW of about 558 and a Durran's softening point of about 71°C.

B. The reactants and procedure of A above was employed except that no dicumyl peroxide was employed. The resultant modified epoxy resin had an EEW of about 558 and a Durran's softening point of about 71°C.

C. Adhesives were prepared from A and B above according to the procedure in Example 1-D. The results were as follows:

| Sample | Tensile Shear Strength, psi 77°F | 250°F |
|---|---|---|
| A | 5716 | 1083 |
| B | 5333 | 866 |

EXAMPLE 8

A. Room Temperature Curing Structural Adhesive

A structural epoxy adhesive must produce bonds that have three characteristics: (1) high lap shear and peel strength, (2) low creep (ability to carry a calculated load indefinitely without yielding), and (3) stability against various forms of environmental attack — temperature, humidity, etc.

Room temperature curing agents of which triethylenetetraamine (TETA), diethylenetriamine (DETA), and polyamides are most commonly used have never been able to provide adhesives with suitable peel strength, even with modified epoxies that give good peel strength when cured at elevated temperature. We have now prepared carefully selected epoxy-modifier-hardener systems that are found to meet all the requirements for a structural adhesive. Since the vulcanization of the nitrile rubber modifier is an important step in the preparation, examples are presented as a part of this patent application. The preparation and testing of the adhesive is described, followed by a comparison to results obtained when the variables or their levels are changed from the optimum.

To a 10-gallon kettle was added:

75 lb. of epoxy novolac resin employed and described in Example 6, 13.5 lb. polymer modifier as employed and described in Example 6, 24 grams tetrabutyl phosphonium acetate acetic acid complex catalyst as a 70 percent solution in methanol.

The charge was heated to the reaction temperature of 100°C and held 1 hour to assure complete reaction of the carboxyls on the rubber with epoxide. Then 85 grams of dicumyl peroxide were added and the temperature raised to 150°C for 2 hours reaction under vacuum. A product was then drummed out and cooled, analyzing 20.95 percent epoxide and having a viscosity of 53500 cp. at 25°C.

An adhesive was formulated from 118 parts of this resin, 40 parts aluminum powder, 10 parts colloidal silica, and 34 parts DEH 29 hardener, a polyethylene polyamine containing about 10.9 percent primary, 17.9 percent secondary and 5.9 percent tertiary nitrogen and an average amine hydrogen equivalent weight of about 30.3.

Lap shear samples were prepared on aluminum substrates as described previously and tested according to ASTM D-1002-64. The samples were cured 4 days at room temperature prior to testing.

| Test Temp. | Lap Shear Strength |
|---|---|
| Room Temp. | 4560 psi |
| 150°F | 3480 psi |
| 180°F | 2130 psi |
| 210°F | 1040 psi |

A climbing drum peel sample was prepared according to ASTM D-1781-62 using 1 inch × 12 inch × 0.020 inch Type 304 stainless steel substrates, etched in conc. HCl at room temp. The peel strength after 4 days cure at room temperature was measured as 89 lb/inch width. These strengths correspond to those we find for high temperature cured structural epoxies. temperature cured structural epoxies.

B. Variation in the Hardener Series Including Diethylene Triamine and its Homologs 150 grams of a diglycidyl ether of bisphenol A having an EEW of about 189 epoxy plus 45 g. of an acrylonitrile-butadiene copolymer having an average molecular weight of 2200 and a COOH functionality of about 1.9 were mixed and reacted to give complete reaction of the carboxyls with epoxide. The vulcanization step was omitted in this case.

To 6.5 grams of this resin was added:
a. 1.0 gram aluminum powder
b. 0.25 gram colloidal silica
c. amount as specified in the Table of a hardener belonging to the diethylenetriamine family.

Test samples were prepared for the climbing drum peel test, with a 4-day room temperature cure preceding the actual peel test.

| Hardener | Amount | Peel Value |
|---|---|---|
| DETA | 0.522 g. | 2 lb/inch |
| TETA | 0.725 g. | 42 lb/inch av. |
| TEPA | 0.930 g. | 50 lb/inch |
| D.E.H. 29 | 1.132 g. | 75 lb/inch |

This shows the improved performance given by the higher molecular weight hardener homologs. In each case, the hardener was assumed to be four-functional; that is, only the hydrogens attached to the terminal nitrogens were assumed reactive. Thus, excess hardener was present over the amount normally calculated as stoichiometric. That the excess hardener is beneficial is demonstrated in Example 8-C below.

C. To a 500 ml 3-necked flask equipped for agitation, nitrogen purge, evacuation, and temperature control, was added:

120 grams of a 2.1 functional epoxy novolac resin as defined in Example 6.

21.6 grams polymer modifier as described in Example 6.

60 mg tetrabutyl phosphonium acetate.acetic acid complex catalyst.

The contents were heated to 120°C and held for 1 hour to assure complete reaction of the rubber carboxyls with epoxide. Then 0.292 grams of dicumyl peroxide was added and the temperature raised to 150°C and held for 2 hours under a full vacuum. The product was then cooled and poured off as a bright yellow liquid, analyzing 21.7 percent epoxide and with a viscosity of 39000 cp.

A "masterbatch" was made from:
70.8 g. above resin
12 g. aluminum powder
3 g. colloidal silica Four adhesives were prepared by mixing 7.15 grams of the above formulation with the following amounts of D.E.H. 29 hardener.

A. 1.08 g. D.E.H. 29 (stoichiometric)
B. 1.61 g. D.E.H. 29 (stoichiometric)
C. 2.15 g. D.E.H. 29 (stoichiometric)
D. 4.22 g. polyamide having an amine hydrogen equivalent weight of about 150.

Lap shear samples were prepared as already described and Tee Peel samples were also prepared according to ASTM D-1876-61T, using 1 inch × 8 inch × 0.024 inch Type 2024-T3 aluminum strips, etched by the FPL procedure. Two strips were spread with the adhesive, then sandwiched together and clamped with paper clips for the four day cure period.

Test Results

| Adhesive Sample | Lap Shear Strength | Tee Peel |
|---|---|---|
| A | 3540 psi (av. of 2) | 11.2 lb/in. |
| B | 3860 | 20.5 |
| C | 4850 | 32.0 |
| D | 2760 | 3.2 |

This test indicates improved performance for adhesives using greater amounts of the D.E.H. 29 polyethylene polyamine hardener. However, results from environmental exposure tests and elevated temperature testing indicate a fall-off in performance at double stoichiometric D.E.H. 29 (as in C above) and thus the formulation becomes non-structural for this reason.

Sample B above did not show reduced performance in this respect.

D. Optimum Rubber Modifier Level

In addition to the test using 18 phr of the vulcanized rubber modifier, lower levels were tested by diluting with unmodified resin or by preparing separate modified epoxies. Results are given below, using 32 phr (parts per 100 parts of epoxy resin) D.E.H. 29 polyethylene polyamine hardener in all cases. In each instance the polymer modifier which was vulcanized was that described in Example 6 employing the vulcanization procedure of Example 8C.

| PHR of Modifier | Lap Shear | Climbing Drum | Tee Peel |
|---|---|---|---|
| 18 | 3860 psi | — | 20.5 lb/in. |
| 15 | 4270 | 92 lb/in. | 5.7 lb/in. |
| 13 | 4300 | 88 | 7.0 |
| 9 | 4300 | 25 | 6.2 |
| 6 | 4300 | 9 | 6.4 |

E. Variation in Rubber Composition

Vulcanized rubber modified 2.1 functional epoxy novolac resin was prepared containing 10 phr rubber using
A. 3500 av. M.W. acrylonitrile-butadiene polymer, 26 percent acrylonitrile, about 1.9 COOH average functionality,
B. 3500 av. M.W. acrylonitrile-butadiene polymer, 18.6 percent acrylonitrile, about 1.85 COOH average functionality.

Adhesives prepared and tested as in the examples above gave

|  | Lap Shear | Climbing Drum | Tee Peel |
|---|---|---|---|
| (A) | 4150 psi | 88 lb/inch | 7.0 lb/inch |
| (B) | 4790 | 18 lb/inch | 7.7 lb/inch |

F. Environmental Stability of Bonds

The adhesive formulations from Example 8-C were used to prepare lap shear samples that were subsequently placed under an applied stress and exposed to a programmed temperature-humidity environment. The lap shear samples were held at these conditions until the sample failed (broke).

| Sample | Conditions Required to Cause Failure (av. of 2 samples) |
|---|---|
| A | 57°C, 1500 psi stress: 2 days dry + 2 hrs. at 98% rel. humidity |
| B | 57°C, 1500 psi: 2 days dry + 1 hr. at 98% rel. humidity |
| C | 57°C, 1500 psi: 1 day dry, <50% rel. humidity |
| D | 40°C, 1500 psi: 1 hr. dry |

I claim:

1. A curable epoxy resin modified with a sulfur or organic peroxide vulcanized polymer of butadiene and acrylonitrile, methacrylonitrile or mixtures of acrylonitrile and methacrylonitrile comprising A. an epoxy resin having an average of more than one vicinal epoxy group and
B. from about 0.03 to about 0.2 parts by weight per part by weight of Component (A) of unvulcanized polymer of butadiene and acrylonitrile, methacrylonitrile or mixtures of acrylonitrile and methacrylonitrile having an average molecular weight of from about 2000 to about 20,000 and containing from about 1.2 to about 5 groups per molecule of a reactive group selected from -COOH, -OH or -SH;
wherein said unvulcanized polymer has been reacted into the molecule of the epoxy resin through the -COOH, -OH, or -SH groups and then vulcanizing said polymer with sulfur or an organic peroxide.

2. The composition of claim 1 wherein component (A) is the reaction product of
  1. a liquid epoxy resin having an average of more than one vicinal epoxy group per molecule with
  2. a dihydroxyl-containing compound.

3. The composition of claim 2 wherein component (A-1) is diglycidyl ether of bisphenol A and component (A-2) is bisphenol A.

4. The composition of claim 3 wherein component B is a butadiene-acrylonitrile polymer containing -COOH groups.

5. A curable composition comprising the modified epoxy resin of claim 1 and a curing amount of a curing agent or curing catalyst.

6. A curable composition comprising the modified epoxy resin of claim 2 and a curing amount of a curing agent or curing catalyst.

7. A curable composition comprising the modified epoxy resins of claim 3 and a curing amount of a curing agent or curing catalyst.

8. The curable composition of claim 5 wherein the curing agent is dicyandiamide.

9. The curable composition of claim 6 wherein the curing agent is dicyandiamide.

10. The curable composition of claim 7 wherein the curing agent is dicyandiamide.

11. The cured composition resulting from curing the composition of claim 5.

12. The cured composition resulting from curing the composition of claim 6.

13. The cured composition resulting from curing the composition of claim 7.

14. The cured composition resulting from curing the composition of claim 8.

15. The cured composition resulting from curing the composition of claim 9.

16. The cured composition resulting from curing the composition of claim 10.

17. The curable composition of claim 5 wherein the curing agent is a polyethylene polyamine having an average amine hydrogen equivalent weight of at least about 27.

18. The cured composition resulting from curing the composition of claim 17.

19. The composition of claim 1 wherein component A is an epoxy novolac resin.

20. The composition of claim 19 wherein the epoxy novolac resin has an average functionality of from about 2.05 to about 2.5.

21. A curable composition comprising the modified epoxy novolac resins of claim 19 and a curing amount of a curing agent or a curing catalyst.

22. A curable composition comprising the modified epoxy novolac resins of claim 20 and a curing amount of a curing agent or a curing catalyst.

23. The cured composition resulting from curing the composition of claim 21.

24. The cured composition resulting from curing the composition of claim 22.

25. The composition of claim 1 wherein compound (B) has an average of from about 1.7 to about 2.4 -COOH, -OH, or SH groups per molecule.

* * * * *